April 26, 1960 W. O. MARTIN 2,934,102
LOADING AND UNLOADING SYSTEM FOR LIQUIDS
Filed June 6, 1958 2 Sheets-Sheet 2
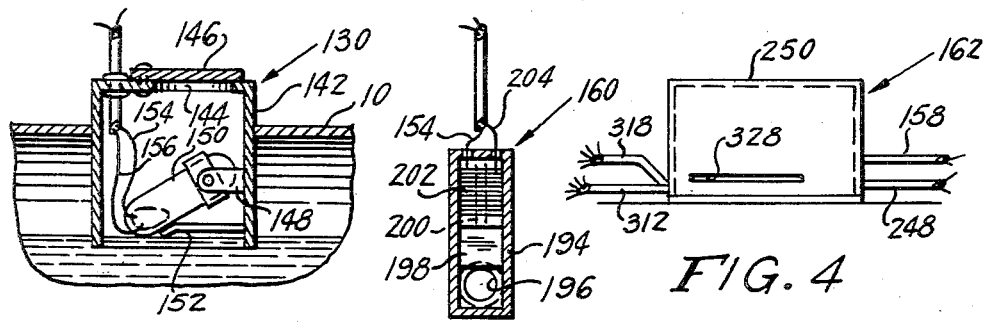
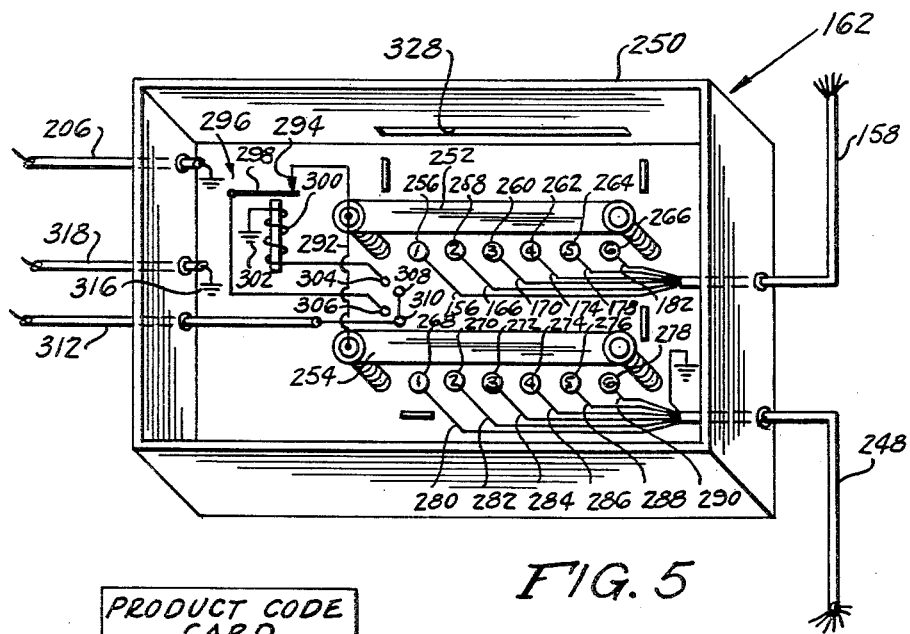
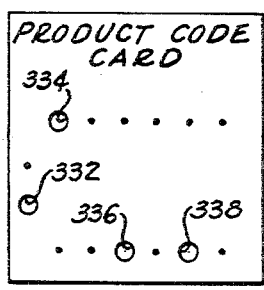
INVENTOR
WALTER O. MARTIN
BY Gustave Miller
ATTORNEY United States Patent Office 2,934,102
Patented Apr. 26, 1960

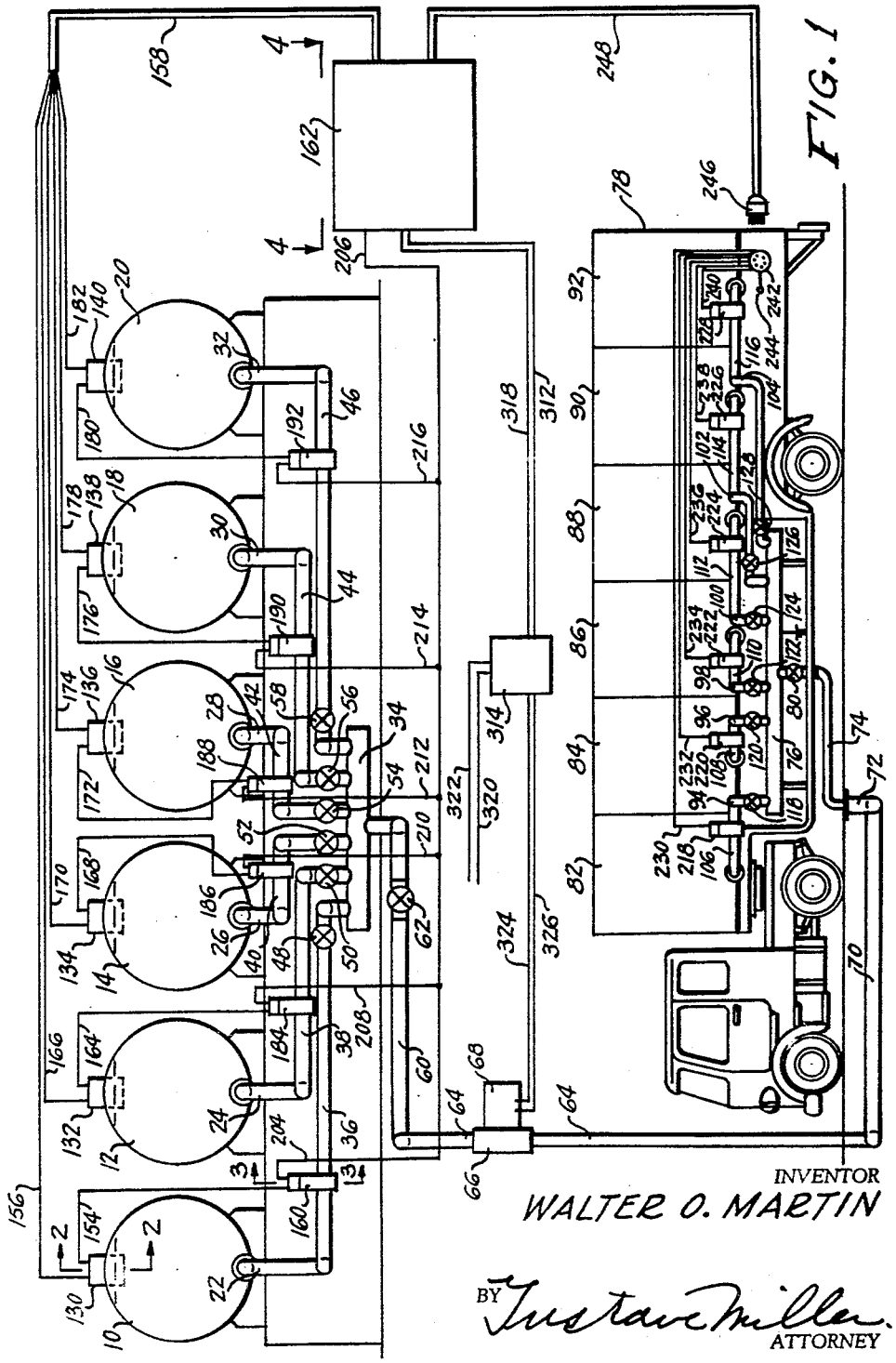

2,934,102

LOADING AND UNLOADING SYSTEM FOR LIQUIDS

Walter O. Martin, Charleston, W. Va.

Application June 6, 1958, Serial No. 740,499

6 Claims. (Cl. 141—21)

This invention relates to the loading and unloading of liquid products transported in tanks or the like, and it particularly relates to a system for loading and unloading of the liquids in such a manner as to prevent intermixing of the products and overflow of the tanks.

In the transportation of liquids, particularly of the inflammable type, it is highly important to get the products unloaded into the proper storage tank while, at the same time, it is essential to prevent any overflow from these tanks.

Under the systems used heretofore, the unloading is accomplished either from the rear or the side of the tank through a hose connected with a valve coming from a compartment of the tank. The person doing the unloading must be careful to watch the storage tank at all times so that when it reaches the top he can quickly cut off the flow before any overflow takes place. He also has the responsibility of making certain that the right product is delivered into the proper storage tank. This is often not done under the prior systems since the operator can easily open the wrong valve.

It is, therefore, one object of the present invention to provide a system wherein it would be impossible to intermix the products and wherein overflow would be automatically prevented so that there results great savings of the products and so that the danger of fire is greatly decreased.

Another object of the present invention is to provide a system wherein both loading and unloading of the liquid products would be substantially free of human error.

Another object of the present invention is to provide a system wherein industries would be greatly benefited by the savings resulting from the proper delivery of the various liquid products.

Another object of the present invention is to provide a system which can be used either for loading, or for unloading, or both loading and unloading.

Another object of the present invention is to provide a system which would eliminate all restrictions on the size of tank trucks or compartments, insofar as such restrictions have heretofore been necessary to control the fire hazards due to intermixing and overflow problems.

Other objects of the present invention are to provide an improved system, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which:

Fig. 1 is a somewhat diagrammatic view of the system as used in the transfer of liquid products from a tank truck to individual storage tanks.

Fig. 2 is an enlarged detailed view taken on line 2—2 of Fig. 1.

Fig. 3 is an enlarged, detailed view taken on line 3—3 of Fig. 1.

Fig. 4 is a top plan view taken on line 4—4 of Fig. 1.

Fig. 5 is an enlarged, detailed interior view of the control box, shown with one side removed to show the interior.

Fig. 6 is a front elevational view of a code card used in the control box.

Referring now in greater detail to the drawings wherein similar reference characters refer to similar parts, there is shown a system which includes a series of storage tanks 10, 12, 14, 16, 18 and 20. Leading into the bottom of each of these tanks is a feed line indicated respectively at 22, 24, 26, 28, 30 and 32. Each of these feed lines is connected to a manifold 34 through conduits indicated respectively at 36, 38, 40, 42, 44 and 46. Interposed between each of these conduits and the manifold 34 is a hand-operable valve indicated respectively at 48, 50, 52, 54, 56 and 58.

The manifold 34 is, in turn, connected through a conduit 60, in which is interposed a manually-operable valve 62, to a conduit 64 in which is interposed a pump 66 operable by a motor 68. The conduit 64 is then connected to a conduit 70 which is connected at its other end to a coupling 72 to the other side of which is connected a conduit 74 leading to a manifold 76 mounted on the tank truck 78. A manually-operable valve 80 is interposed in conduit 74 below manifold 76. The manifold 76 is connected to individual compartments 82, 84, 86, 88, 90 and 92 in the tank truck 78 through respective lines 94, 96, 98, 100, 102 and 104 which are, in turn, connected to respective lines 106, 108, 110, 112, 114 and 116 leading into the compartments. Manually-operable valves 118, 120, 122, 124, 126 and 128 are interposed in the respective lines 94, 96, 98, 100, 102 and 104.

At the upper end of each of the tanks 10 through 20 there is provided a mercury limit switch assembly generally designated 130, 132, 134, 136, 138 and 140. Since a description of one of these switch assemblies will suffice for a description of all due to the fact that they are all alike, a detailed view is shown of switch assembly 130 in Fig. 2. As shown in Fig. 2, the switch assembly 130 comprises a housing 142 having an open lower end extending into the tank 10 and an upper end provided with an access opening 144 closable by a hinged door 146. Within the housing 142 is provided a bracket 148 on which is mounted a mercury switch device including a float switch 150. The float switch 150 is supported for pivotal movement on bracket 148 and when the float switch is in lower position, resting on arm 152, it keeps the mercury switch closed; however, when the liquid in tank 10 rises beyond the predetermined limit, it moves float switch 150 up around its pivot and this causes the mercury switch to open. Wires 154 and 156 extend through the top of housing 142, the wire 154 leading to a solenoid valve 160 interposed in conduit 36 while the wire 156 leads to a control box 162 through a cable 158.

Each of the other switch assemblies 132 through 140 is likewise provided with similar wires, as indicated at 164 and 166 for switch assembly 132, at 168 and 170 for switch assembly 134, at 172 and 174 for switch assembly 136, at 176 and 178 for switch assembly 138, and at 180 and 182 for switch assembly 140. The wires 166, 170, 174, 178 and 182 along with wire 156 all lead through the same cable 158 to the control box 162, while the wires 164, 168, 172, 176 and 180 lead respectively to solenoid valves 184, 186, 188, 190 and 192 interposed respectively in conduits 38, 40, 42, 44 and 46.

Since each solenoid valve 160, 184, 186, 188, 190 and 192 is like the other, a description of one serves as a description of all. Consequently, the valve 160 is shown in detail in Fig. 3 and comprises a housing 194 having an opening 196 in the lower end of one side wall in correspondence with the conduit 36. This opening 196 is adapted to be closed by a gate 198 attached to the lower end of a stem-like core 200 which extends through a solenoid coil 202. The coil 202 is connected by the above-described wire 154 to switch assembly 130 and by a wire 204 to a main line 206 leading to the control box 162. The solenoid coil 202 normally keeps the gate 198 open but, upon opening of normally-closed float switch 150 by a rise of the liquid in tank 10 above the predetermined limit, the solenoid coil 202 is de-activated, which causes core 200 together with gate 198 to fall down, so that gate 198 closes opening 196.

The solenoid valves 184 through 192 are, as stated previously, identical to valve 160 and are provided with similar wires 208, 210, 212, 214 and 216 leading to the main line 206 connected to the control box 162. In like manner, normally-closed solenoid valves 218, 220, 222, 224, 226 and 228 are interposed in the respective lines 106, 108, 110, 112, 114 and 116 leading to the compartments in the tank truck 78. These solenoid valves 218 through 228 are similar to valve 160 and their solenoid coils are connected by electrical lines or wires shown respectively at 230, 232, 234, 236, 238 and 240 to a receptacle 242 having a ground connection at 244. This receptacle 242 has an inlet opening for each of the lines 230 through 240 and is adapted to receive a plug 246 having a male portion for each inlet opening in the receptacle 242. Each of these male portions are connected through corresponding electrical lines or wires, extending through a cable 248, to the control box 162.

The control box 162 comprises a housing 250 within which are positioned two contact bars 252 and 254 arranged one below the other in the same vertical plane. Coacting with bar 252 are six contacts 256, 258, 260, 262, 264 and 266 each of which is connected through corresponding electrical lines 156, 166, 170, 174, 178 and 182 through the cable 158 to the corresponding switch assemblies 130, 132, 134, 136, 138 and 140. The contacts 256 through 266 are normally biased into abutment against the bar 252 but may be pressed away therefrom.

The bar 254 has coacting therewith six contacts 268, 270, 272, 274, 276 and 278 each of which is connected through corresponding electrical lines 280, 282, 284, 286, 288 and 290 to the corresponding male contact points on the plug 246, these lines 280 through 290 extending through the cable 248. The contacts 268 through 278 are also biased into normal abutment against bar 254 but may be pressed away therefrom.

The bars 252 and 254 are in electrical circuit through a line 292 which is connected to a contact 294 of a relay generally designated 296. This relay 296 also includes a pivoted plate 298 and a solenoid device 300. The coil of the solenoid device is connected between ground at 302 and a contact 304, while the pivoted plate 298 is connected to a contact 306. The contact 304 is biased into abutment with a contact 308 and the contact 306 is biased into abutment with a contact 310, both of these contacts 308 and 310 being connected in series to an electrical line 312 which leads to a distributor panel and fuse box 314. The circuit from the box 314 is completed to ground, indicated at 316 (Fig. 5) through a line 318. The distributor panel and fuse box 314 is connected to any suitable source of electrical energy through lines 320 and 322.

The distributor panel and fuse box 314 is also connected by lines 324 and 326 to the electric motor 68 whereby the motor 68 is connected through the box 314 to the source of electrical energy (not shown).

In the operation of this system, the driver or operator would be furnished with a proper punch card for each product carried in the truck. If the products were shipped by barge, the shipment would be accompanied by a proper punch card for each product. There is one coded card for each product loaded or unloaded. These code cards are adapted to be individually inserted through a slot 328 in the top of the housing 250 on control box 162. When so inserted the card is so positioned that it passes between the bars 252 and 254 on one side and the contacts 256 through 266 and 268 through 278 on the other side so that these contacts are held insulated from their respective bars 252 and 254 by the paper of the card. In similar manner, the card isolates the contacts 304 and 306 from the contacts 308 and 310. However, where a desired electrical contact is to be established, the card is punched with an opening or openings to permit such contact to be made. For example, in Fig. 6, there is shown a card 330 which is so punched that opening 332 permits contact between contact points 306 and 310 to establish a circuit between the bars 252 and 254 and the box 314 which is, in turn, connected to the source of electrical energy. The opening 334 in the card 330 permits contact between the bar 252 and contact 256, while the openings 336 and 338 permit contact between bar 254 and contacts 272 and 276. In this manner, the insertion of card 330 through slot 328 establishes a circuit which permits opening of the valves 222 and 226 causing flow out of their respective compartments 86 and 90, the liquid being pumped into tank 10 by pump 66 until a predetermined level is reached in the tank 10. When the level is reached, the mercury switch in switch assembly 130 is caused to open by the rise of float switch 150, thereby causing the solenoid valve 160 to close. Other cards would be punched, either by hand or by machine, for other possible combinations.

Although a pump 66 has been illustrated, it may not necessarily be used since, in some instances, the arrangement may be such that a gravity flow from the truck, barge or the like to the storage tank is used instead of the pump.

If no card is inserted into the control box 162, the system would be inoperative since, in such case, all corresponding contacts would meet including contacts 304 and 308. This would establish a circuit through the relay 296 which would then open the circuit between contact 294 and pivoted plate 298. This would open the circuit between bars 252 and 254 and the source of electrical energy.

This system could be used for loading, unloading or both. If it is used for both operations, the code card would be furnished the loader by the dispatcher and he, in turn, would send the code card along with the load. Then the card could be used to unload the products in similar manner to the way they were loaded. If the system is used only to unload, the dispatcher would send the coded card to the unloader.

Although this invention has been described in considerable detail, such description is intended as being illustrative rather than limiting, since the invention may be variously embodied, and the scope of the invention is to be determined as claimed.

Having thus set forth this invention, what is desired to be claimed is:

1. A system for selectively loading and unloading a plurality of liquids between a plurality of storage tanks and a plurality of sources of liquid supply in separate tanks of a multi-tank transport vehicle, said system comprising a plurality of storage tanks, a manifold means, and a plurality of tanks in a multi-tank transport vehicle, a first series of liquid conduits connecting said storage tanks to said manifold means, a second series of liquid conduits connecting said vehicle tanks to said manifold means, a float means in each tank of one of said pluralities of tanks, an electrical switch means associated with each float means, each switch being normally closed but arranged to be opened upon upward movement of the corresponding float as the liquid level rises in the tank, a solenoid valve interposed in each liquid conduit of said first series, a control network, each of said switches being in electrical circuit with a respective solenoid and also individually in circuit with said control network, said solenoid valves being normally open when the corresponding switch is closed and being arranged to close upon opening the corresponding switch, a second series of solenoid valves, each of said second series valves being interposed in one of said second series of conduits between its individual tank and said manifold means, said second series of solenoid valves being normally closed and being in electrical circuit with said control network, said control network being selectively actuable to connect selected tanks of said transport vehicle with selected storage tanks and to electrically connect selected switches with a source of electrical energy.

2. The system of claim 1, said float means being located within and adjacent the top of each tank of said plurality of storage tanks.

3. The system of claim 1, said manifold means comprising a manifold to which said first series of conduits is connected, a second manifold to which said second series of conduits is connected, and a conduit detachably connecting said two manifolds.

4. The system of claim 2, and a motor-operated pump in said conduit between said two manifolds.

5. The system of claim 1 wherein said second series of solenoid valves are releasably electrically connected to said control network.

6. The system of claim 1 wherein said control network comprises contact means for establishing an electrical circuit between each solenoid valve means and the source of electrical energy, said circuit being normally closed but being selectively and partially operable by means of a card inserted into said network, said card having selective means to permit establishment of selected portions of the circuit and serving as a circuit breaker for the remaining portions of said circuit.

References Cited in the file of this patent

UNITED STATES PATENTS

| | | |
|---|---|---|
| 1,911,987 | Casey | May 30, 1933 |
| 2,431,058 | Manning | Nov. 18, 1947 |
| 2,692,923 | Ash | Oct. 26, 1954 |
| 2,792,148 | Goldenberg | May 14, 1957 |